(12) United States Patent
Shin

(10) Patent No.: US 10,086,663 B2
(45) Date of Patent: Oct. 2, 2018

(54) TIRE PRESSURE MONITORING APPARATUS AND METHOD

(71) Applicant: Hyundai Mobis Co., Ltd., Seoul (KR)

(72) Inventor: Kyu Chul Shin, Seoul (KR)

(73) Assignee: Hyundai Mobis Co., Ltd., Seoul (KR)

( * ) Notice: Subject to any disclaimer, the term of this patent is extended or adjusted under 35 U.S.C. 154(b) by 802 days.

(21) Appl. No.: 14/467,156

(22) Filed: Aug. 25, 2014

(65) Prior Publication Data

US 2015/0149110 A1 May 28, 2015

(30) Foreign Application Priority Data

Nov. 28, 2013 (KR) .................. 10-2013-0146161

(51) Int. Cl.
*B60C 23/20* (2006.01)
*B60C 23/04* (2006.01)

(52) U.S. Cl.
CPC .......... *B60C 23/20* (2013.01); *B60C 23/0457* (2013.01); *B60C 23/0476* (2013.01); *B60C 23/0488* (2013.01); *B60C 23/0442* (2013.01)

(58) Field of Classification Search
None
See application file for complete search history.

(56) References Cited

U.S. PATENT DOCUMENTS

| | | | |
|---|---|---|---|
| 4,862,364 A * | 8/1989 | Matsuda | B60T 8/90 123/491 |
| 5,780,733 A | 7/1998 | Meunier | |
| 2003/0135858 A1 * | 7/2003 | Nemoto | H04B 1/082 725/75 |
| 2004/0021562 A1 * | 2/2004 | Prenninger | B60C 23/0416 340/445 |
| 2011/0260885 A1 * | 10/2011 | Newman | G08G 1/0965 340/902 |
| 2013/0021149 A1 * | 1/2013 | Shibagaki | B60C 23/0418 340/442 |

FOREIGN PATENT DOCUMENTS

| | | |
|---|---|---|
| JP | 9-249008 A | 9/1997 |
| JP | 2005-8109 A | 1/2005 |
| JP | 2010-234858 A | 10/2010 |
| JP | 2012-206680 A | 10/2012 |
| JP | 2013-14224 A | 1/2013 |
| JP | 2013-86783 A | 5/2013 |
| KR | 10-2011-0058444 A | 6/2011 |

OTHER PUBLICATIONS

JP2005008109A machine translation on Jul. 31, 2017.*
JP2010234858A machine translation on Aug. 2, 2017.*
Chinese Office Action dated Apr. 25, 2016 in counterpart Chinese Application No. CN 201410096680.1 (7 pages, in Chinese).

* cited by examiner

*Primary Examiner* — John Kuan
(74) *Attorney, Agent, or Firm* — NSIP Law

(57) ABSTRACT

Provided is an apparatus for estimating an external temperature for monitoring a tire pressure. The apparatus includes a sensor transmitter configured to transmit stop time information which is obtained by measuring a stop time of a vehicle at certain intervals, by using wireless communication, and a sensor receiver configured to receive the stop time information through the wireless communication, and measure the external temperature by using the received stop time information.

13 Claims, 4 Drawing Sheets

TIRE PRESSURE MONITORING APPARATUS AND METHOD

CROSS-REFERENCE TO RELATED APPLICATIONS

This application claims priority under 35 U.S.C. § 119 to Korean Patent Application No. 10-2013-0146161, filed on Nov. 28, 2013, the disclosure of which is incorporated herein by reference in its entirety.

TECHNICAL FIELD

The present invention relates to a tire pressure monitoring apparatus and method.

BACKGROUND

In order to enhance the durability, riding comfort, and braking power of a tire equipped in a vehicle, a pressure and temperature of the tire should be maintained in an appropriate state. To this end, an apparatus for monitoring pressures and temperatures of tires is needed. In automotive engineering, the apparatus is called a Tire Pressure Monitoring System (TPMS).

FIG. 1 is a block diagram illustrating a configuration of a TPMS sensor included in a general TPMS.

Referring to FIG. 1, the TPMS sensor includes a pressure sensor 11, a temperature sensor 13, an acceleration sensor 15, a supply voltage sensor 17, a controller 19, a Radio Frequency (RF) transmitter 21, and a Low Frequency (LF) receiver 23.

The pressure sensor 11 senses an internal pressure of a tire to detect a low pressure and a pressure change. The temperature sensor 13 senses an internal temperature of the tire to correct an error of the pressure sensor, and senses a tire temperature. The acceleration sensor 15 senses an acceleration and a speed to determine whether a vehicle is running and detect a sensor position. The supply voltage sensor 17 measures a voltage of a battery 25, which is provided in the TPMS sensor, to detect a low pressure state of the battery 25.

When the TPMS sensor periodically senses a tire pressure and a tire temperature in running, the TPMS sensor periodically performs RF transmission. In an operation of periodically sensing the tire pressure, the TPMS sensor compares a currently sensed pressure and a previously sensed pressure, and when a pressure change equal to a certain pressure or more occurs, the TPMS sensor performs RF transmission based on an internal pressure change of a tire. When a response command of the TPMS sensor is requested by the outside for the special purposes of vehicle maintenance, a production line, and determination of a sensor position by using an LF initiator, the TPMS sensor performs RF transmission based on a signal of an external device so as to respond to the requested command.

As described above, the TPMS sensor transmits RF data when an internal pressure of a tire is changed. Examples of an internal pressure change of the tire includes a pressure change, which occurs due to a change in an internal air amount of the tire, and a pressure change which occurs due to a change in an internal air temperature of the tire.

In particular, when an internal air temperature of a tire is changed, a pressure change based on an ideal gas equation expressed as the following Equation (1) occurs.

$$P_{warm} = \frac{(RCP + P_{ambient}) \cdot T_{tire}}{T_{reference}} - P_{ambient} \quad (1)$$

where $P_{warm}$ denotes an internal pressure of a tire based on an internal temperature change of the tire, RCP denotes a recommend cold pressure proposed by a vehicle manufacturer, $T_{tire}$ denotes an internal temperature of the tire, $T_{reference}$ denotes an external temperature and external temperature setting value of a vehicle, and $P_{ambient}$ denotes an atmospheric pressure.

An internal air temperature of a tire is changed when an external temperature of the tire is changed or when a wheel temperature increases due to braking of a vehicle or a friction of the tire and a road surface in running of the vehicle. Considering that an external air temperature is very slowly changed, a difference between an internal air temperature and an external air temperature of a tire occurs due to a temperature change caused by running and braking of a vehicle.

Domestic and foreign regulations associated with the TPMS regulate conditions in which a relative tire pressure $P_{warm}$ is calculated depending on a tire temperature, and a low pressure warning and a release of the warning are performed based on the calculated tire pressure.

In Equation (1), RCP is set by a vehicle manufacturer, and $T_{tire}$ is a value that is calculated by using a tire temperature sensed by the TPMS sensor. However, $P_{ambient}$ and $T_{reference}$ should be calculated based on vehicle information or information estimated from other sensing data. $T_{reference}$ is an external temperature, and a TPMS receiver communicating with the TPMS sensor may obtain $T_{reference}$ from another electronic control device through vehicle network communication such as a Controller Area Network (CAN).

A vehicle, which is not equipped with a device for measuring an external temperature, measures a vehicle stop time to estimate the external temperature. In this case, the TPMS sensor receives a result, which is obtained by monitoring a vehicle stop state, from another electronic control device through the TPMS receiver.

A vehicle stop state may be monitored by turning on/off an ignition. When the ignition is turned off, an electronic control device for monitoring the vehicle stop state causes a waste of power of a vehicle battery because using a battery power of a vehicle.

In regulations, a vehicle stop time is set to one hour. Therefore, when an internal temperature of a tire is changed identically to an external temperature within one hour, an error occurs in estimating an external temperature. Generally, an internal temperature of a tire increases due to running and braking of the tire, and when braking of a vehicle is continuously maintained for one hour, an error of about 2 to 3 degrees C. occurs between an internal temperature of the tire and an external temperature. The error causes an error margin of a setting value when a warning notice for notifying a low pressure state of a tire is set.

SUMMARY

Accordingly, the present invention provides a tire pressure monitoring apparatus and method which can reduce a waste of power caused by a sensor receiver in monitoring a vehicle stop state, and can accurately monitor a tire pressure state.

In one general aspect, an apparatus for estimating an external temperature for monitoring a tire pressure includes: a sensor transmitter configured to transmit stop time information which is obtained by measuring a stop time of a vehicle at certain intervals, by using wireless communication; and a sensor receiver configured to receive the stop time information through the wireless communication, and measure the external temperature by using the received stop time information.

In another general aspect, a method of monitoring a tire pressure includes: measuring, by a sensor transmitter, a stop time value of a vehicle by using a sensor equipped in a tire to transmit the measured stop time value to a sensor receiver though wireless communication; and receiving, by the sensor receiver, the measured stop time value through the wireless communication, estimating an external temperature by using the stop time value, calculating a tire pressure by using the estimated external temperature, and monitoring a low pressure state of the tire, based on the calculated tire pressure.

Other features and aspects will be apparent from the following detailed description, the drawings, and the claims.

DETAILED DESCRIPTION OF EMBODIMENTS

The present invention proposes a method that calculates a vehicle stop time under a system environment in which a tire pressure monitoring apparatus cannot use (or cannot secure) an external temperature of a vehicle, and estimates or sets the external temperature by using the calculated stop time. Therefore, a tire pressure change can be smoothly monitored by using the estimated or set external temperature under the system environment in which it is unable to use (or secure) the external temperature of the vehicle. Also, the present invention proposes a method that reduces a dark current consumed by a sensor receiver, thereby minimizing power consumption of a vehicle.

Hereinafter, embodiments of the present invention will be described in detail with reference to the accompanying drawings.

Figure 1:
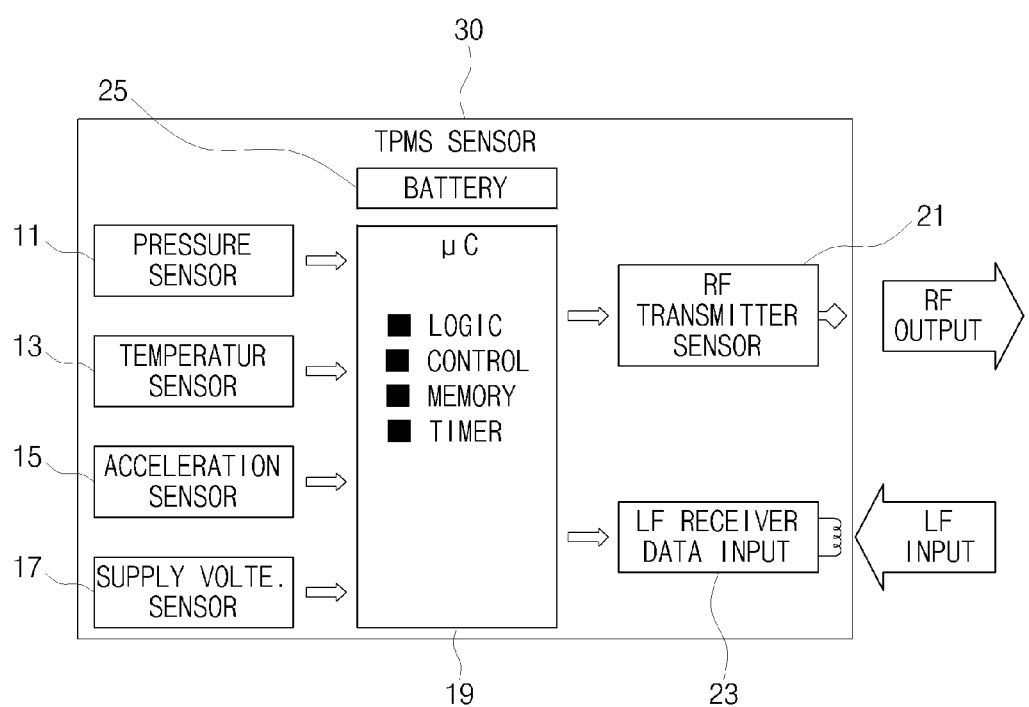
FIG. 1 is a block diagram illustrating a configuration of a TPMS sensor included in a general TPMS.
Figure 2:
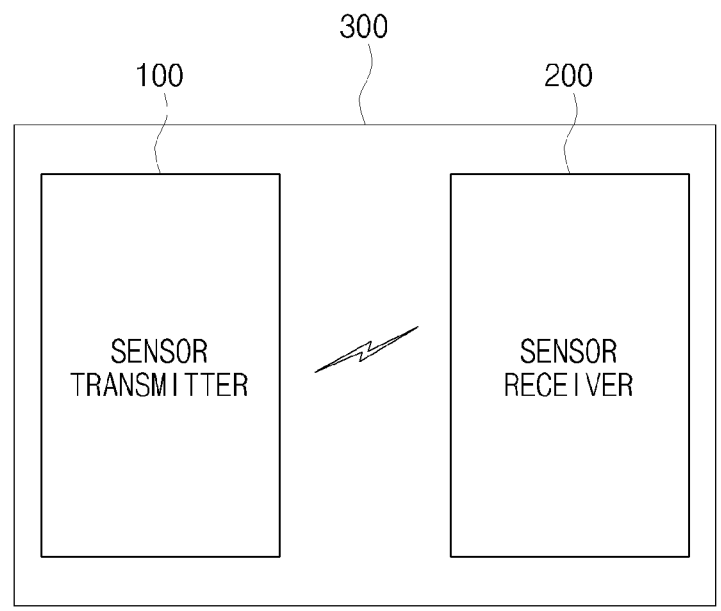
FIG. 2 is a block diagram illustrating an internal configuration of a tire pressure monitoring apparatus according to an embodiment of the present invention.

FIG. 2 is a block diagram illustrating an internal configuration of a tire pressure monitoring apparatus according to an embodiment of the present invention.

Referring to FIG. 2, the tire pressure monitoring apparatus according to an embodiment of the present invention includes a sensor transmitter 100, which is equipped in a vehicle 300, and a sensor receiver 200 that wirelessly communicates with the sensor transmitter 100.

The sensor transmitter 100 is attached to a vehicle tire, and periodically switches between a wakeup mode and a sleep mode. In the wakeup mode, the sensor transmitter 100 periodically senses a tire pressure, a tire inside temperature, a vehicle running state, and a vehicle stop time, and generates the sensed results as information which is used to monitor a tire pressure change. The generated information is changed to wireless communication data according to a predetermined wireless communication scheme, and the wireless communication data is transmitted to the sensor receiver 200.

The sensor receiver 200 receives the wireless communication data, analyzes information included in the wireless communication data, and collects the tire pressure, the tire inside temperature, the vehicle running state, and the vehicle stop time, based on the analyzed information. The sensor receiver 200 estimates a running initial external temperature of a vehicle by using the collected vehicle stop time. The sensor receiver 200 analyzes a tire pressure change by using the estimated running initial external temperature, the tire pressure, and the tire inside temperature. The sensor receiver 200 generates warning information or breakdown information which indicates a tire pressure being in a low pressure state, based on the analyzed tire pressure change, and transfers the generated information to another electronic control device of the vehicle.

Figure 3:
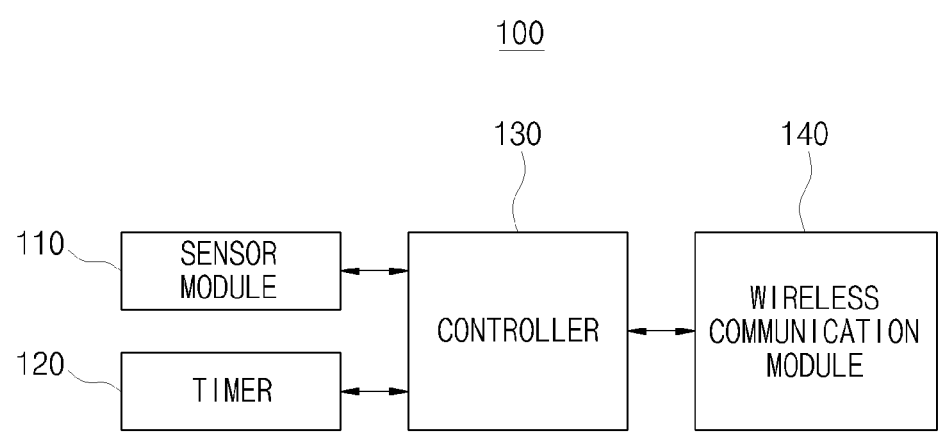
FIG. 3 is a block diagram illustrating an internal configuration of a sensor transmitter of FIG. 2.

FIG. 3 is a block diagram illustrating an internal configuration of the sensor transmitter of FIG. 2.

Referring to FIG. 3, the sensor transmitter 100 generates information which is used to monitor the tire pressure change. In order to transmit the generated information to the sensor receiver 200, the sensor transmitter 100 includes a sensor module 110, a timer 120, a controller 130, and a wireless communication module 140.

The sensor module 110 senses a tire pressure, a tire inside temperature, and a vehicle running state according to a control of the controller 130. Although not shown, the sensor module 110 may include a pressure sensor that senses the tire pressure, a temperature sensor that senses the tire inside temperature, and a motion sensor that senses the vehicle running state.

The timer 120 transfers a wakeup-mode start time and a wakeup-mode end time to the controller 130 at certain intervals that are set by a system designer. Then, the controller 130 is switched to the wakeup mode according to the wakeup-mode start time transferred from the timer 120, and controls the sensor module 110 to sense a tire pressure, a tire inside temperature, and a vehicle running state. Also, while the sensor transmitter 100 is maintaining the wakeup mode, when the vehicle stop state is sensed, the timer 120 counts the vehicle stop time to transmit the counted vehicle stop time to the controller 130, according to a control of the controller 130. In FIG. 2, the timer 120 and the controller 130 are separately illustrated, but the timer 120 may be included in the controller 130.

The controller 130 controls and manages an overall operation of the sensor transmitter 100. In the wakeup mode, the controller 130 indicates a start of a sensing operation of the sensor module 110. Information, associated with the tire pressure, tire inside temperature, and vehicle running state which are transmitted according to the sensing operation of the sensor module 110, is stored in an internal memory (not shown). The controller 130 controls the wireless communication module 140 to transmit the information, stored in the internal memory, to the sensor receiver 200.

The wireless communication module 140 changes the information, associated with the tire pressure, tire inside temperature, and vehicle running state which are transmitted from the controller 130, to wireless communication data according to a communication protocol predefined with the sensor receiver 200, and transmits the changed wireless communication data to the sensor receiver 200.

As described above, the sensor transmitter 100 according to an embodiment of the present invention measures a vehicle stop time by using the motion sensor that determines a vehicle running state, changes the measured stop time to wireless communication data, and transmits the wireless communication data to the sensor receiver 200.

As described below, the sensor receiver 200 estimates an external temperature by using the stop time included in the received wireless communication data, and thus can accurately estimate the external temperature by using the stop time, transmitted as the wireless communication data, under a system environment in which the sensor receiver 200 cannot receive external temperature data from another sensor or electronic control unit of the vehicle.

Transmission of wireless communication data from the sensor transmitter 100 according to an embodiment of the present invention may be designed to be performed in only an automatic learning mode (i.e., an initial mode) of a sensor in initial running of a vehicle. Therefore, power consumption of a battery of the sensor transmitter 100, based on an increase in a transmission length (or the number of transmissions) of the wireless communication data, can be minimized.

Figure 4:
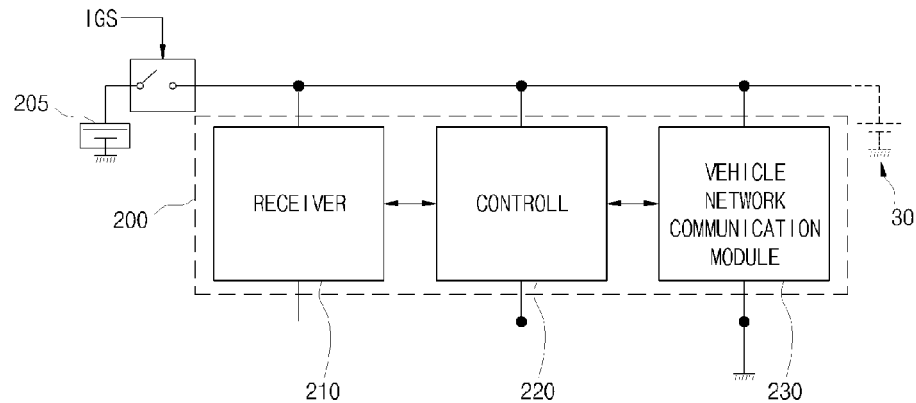
FIG. 4 is a block diagram illustrating an internal configuration of a sensor receiver of FIG. 2.

FIG. 4 is a block diagram illustrating an internal configuration of the sensor receiver of FIG. 2.

Referring to FIG. 4, the sensor receiver 200 is supplied with ignition power 205, and analyzes an operation of receiving wireless communication data from the sensor transmitter 100 and an operation of estimating an external temperature. As described below, the sensor receiver 200 determines whether the stop time included in the received wireless communication data exceeds a certain time (for example, about one hour). In this case, the sensor receiver 200 may be designed to operate with power which is continuously supplied from a vehicle battery 30, for determining whether the certain time (for example, about one hour) elapses. However, the sensor receiver 200 is supplied with the battery power from the vehicle battery 30 during a period where the sensor receiver 200 does not analyze the operation of receiving the wireless communication data from the sensor transmitter 100 and the operation of estimating the external temperature, namely, after an ignition of the vehicle is turned off and thus the supply of the ignition power is stopped, and for this reason, a dark current is consumed. This causes a power waste of the vehicle battery 30. To solve such a problem, in an embodiment of the present invention, a circuit design for the sensor receiver 200 receiving the battery power from the vehicle battery 30 is removed, and the sensor receiver 200 is designed to operate with only the ignition power 205. Therefore, consumption of the dark current generated by the power supplied from the vehicle battery 30 can be reduced.

The sensor receiver 200, which operates with the ignition power, includes a receiver 210, a controller 220, and a vehicle network communication module 230.

The receiver 210 receives the information, associated with the tire pressure, tire inside temperature, vehicle running state, and vehicle stop time, from the sensor transmitter 100, and changes the received information to data which is processible by the controller 220.

The controller 220 receives the data, associated with the tire pressure, tire inside temperature, vehicle running state, and vehicle stop time, from the receiver 210, and analyzes the received data to estimate an external temperature. In detail, when the vehicle stop time is equal to or more than a certain time, the controller 220 estimates the tire inside temperature, transmitted from the sensor transmitter 100, as a running initial external temperature of the vehicle. As the vehicle stop time increases, the tire inside temperature increased by running and braking is lowered until the tire inside temperature becomes similar to an ambient temperature of the vehicle. As a result, an external temperature may be estimated for a stop time in which the tire inside temperature increased by running and braking is similar to the ambient temperature of the vehicle. On the assumption that a stop time in which an internal temperature is similar to an ambient temperature of a vehicle is one hour, when the stop time transmitted from the sensor transmitter 100 is equal to or more than one hour, the controller 220 estimates an internal temperature value of a tire, which is transmitted along with the stop time transmitted from the sensor transmitter 100, as a running initial external temperature of the vehicle. Then, the controller 220 substitutes the estimated external temperature and the tire pressure (transmitted from the sensor transmitter 100) into Equation (1) to calculate a tire pressure $P_{warm}$. The controller 220 compares the calculated tire pressure $P_{warm}$ and a current tire pressure to generate a low pressure warning message, which indicates the current tire pressure being in a low pressure state, or a low pressure warning release message that indicates the current tire pressure being changed from the low pressure state to a normal pressure state.

The vehicle network communication module 230 transmits the low pressure warning message or the low pressure warning release message to an electronic device, which enables a driver to visually check the low pressure warning message or the low pressure warning release message, according to a control of the controller 220.

Hereinafter, operations of the sensor transmitter and the sensor receiver will be described in detail with reference to FIGS. 5 and 6.

Figure 5:
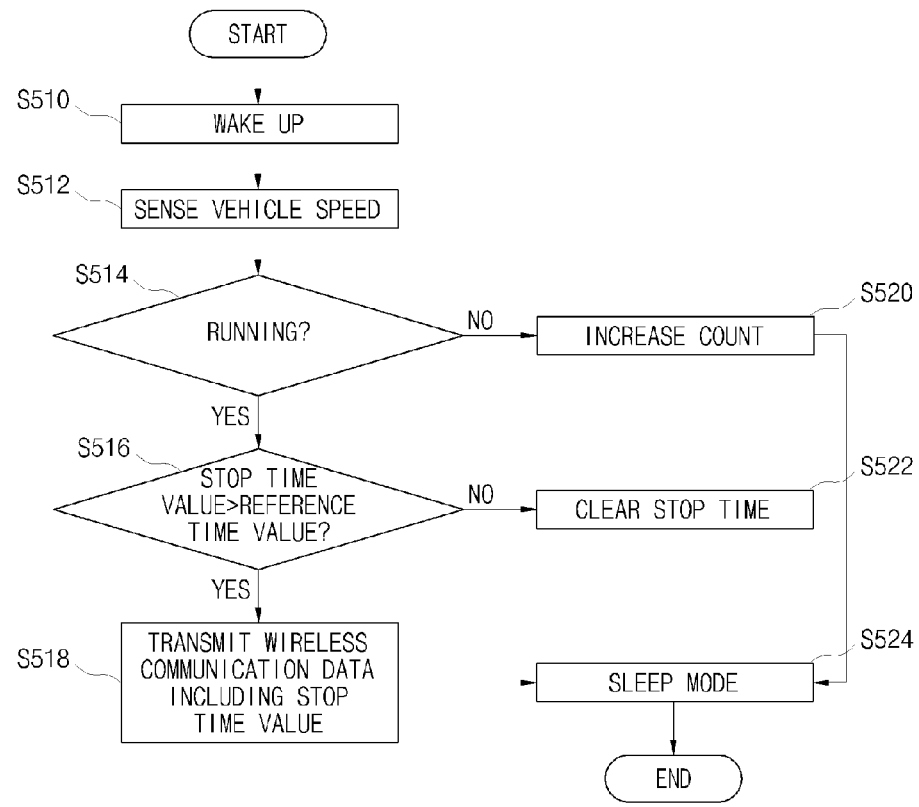
FIG. 5 is a flowchart illustrating an operation of the sensor transmitter of FIG. 3.

FIG. 5 is a flowchart illustrating an operation of the sensor transmitter of FIG. 3. If not specially mentioned, it is assumed that all operations of FIG. 5 are performed by the controller 130 of FIG. 3. For understanding of description, FIG. 3 is also referred to.

Referring to FIG. 5, in operation S510, the controller 130 of the sensor transmitter 100 is switched from the sleep mode to the wakeup mode according to a period which is set in an internal timer.

Subsequently, in operation S512, the controller 130 senses a vehicle speed that is measured by using a motion sensor such as a magnetic sensor or an accelerometer sensor which is senses a running state of a vehicle.

Subsequently, in operation S514, the controller 130 compares the measured vehicle speed and a reference speed to determine whether a vehicle is in a running state or a stop state. For example, when the measured vehicle speed is equal to or higher than the reference speed, the controller 130 determines the vehicle as being in the running state, and when the measured vehicle speed is lower than the reference speed, the controller 130 determines the vehicle as being in the stop state. The reference speed may be variously set depending on a design, and for example, the reference speed may be set to a value of 10 kph to 30 kph.

When it is determined in operation S514 that the vehicle is in the running state, the controller 130 compares a stop time value, for which the vehicle stops before starting to run, and a reference time value, in operation S516. Here, the reference time value is a time taken until a tire inside temperature value, which is increased by running or braking before the vehicle stops, reaches an ambient temperature value of the vehicle, in a state where the vehicle stops. The reference time value may be a statistical time value that is determined through an experiment, and for example, the reference time value may be one hour.

When the stop time is equal to or more than the reference time value as the comparison result, the wireless communication module 140 transmits wireless communication data including the stop time value to the sensor receiver 200 according to a control of the controller 130, in operation S518. In this case, the wireless communication data further includes values associated with a tire pressure, a tire inside temperature, and a vehicle running state at a time when the stop time value is compared with the reference time value, and is transmitted to the sensor receiver 200.

When the transmission of the wireless communication data is ended, the sensor transmitter 100 is switched from the wakeup mode to the sleep mode according to a control of the controller 130, in operation S524. The sensor transmitter 100 (which wakes up at certain intervals) ends a series of operations which are performed in the wakeup mode, and then, the sensor transmitter 100 is switched to the sleep mode, thereby minimizing battery power consumption of the sensor transmitter 100.

When it is determined in operation S514 that the measured vehicle speed is lower than the reference speed, the controller 130 determines a current vehicle state as the stop state, and the timer 120 counts a stop time from a time when the stop state is determined, according to a control of the controller 130, in operation S520. In operation S524, the sensor transmitter 100 is switched from the wakeup mode to the sleep mode according to a control of the controller 130.

When it is determined in operation S516 that the stop time value is less than the reference time value, the controller 30 clears the counted stop time value in operation S522, and the sensor transmitter 100 is switched from the wakeup mode to the sleep mode according to a control of the controller 130. As a result, whether to transmit the stop time value to the sensor receiver 200 is determined according to the comparison result which is obtained by comparing the stop time value with the reference time value in operation S516.

Figure 6:
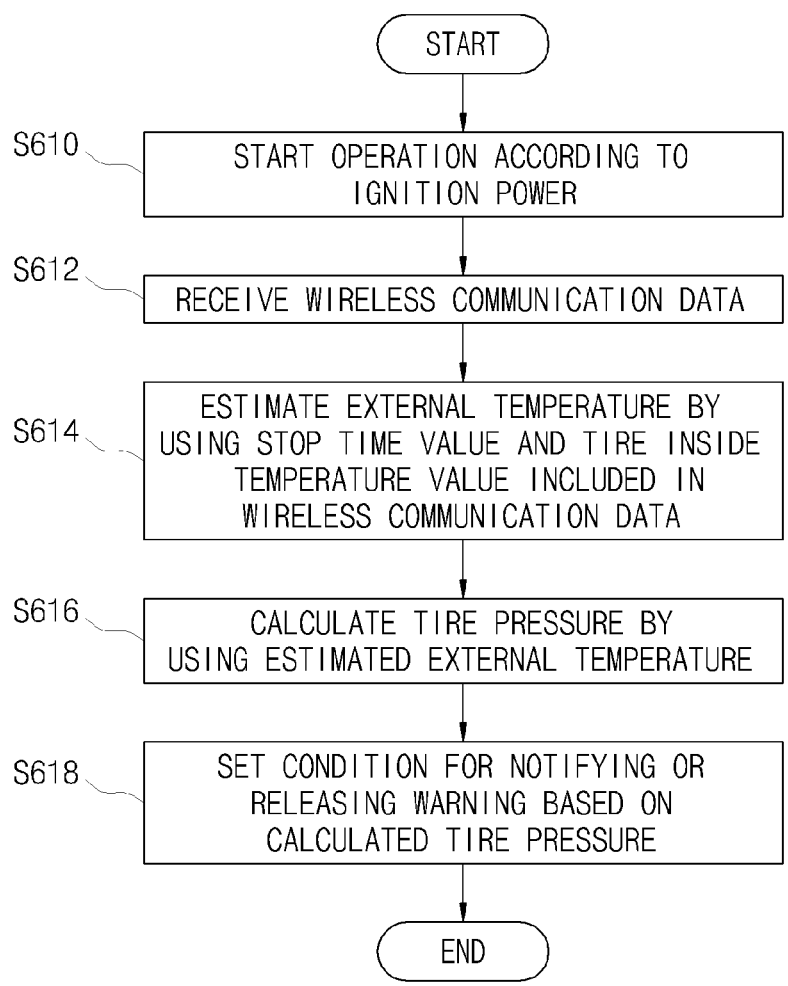
FIG. 6 is a flowchart illustrating an operation of the sensor receiver of FIG. 4.

FIG. 6 is a flowchart illustrating an operation of the sensor receiver of FIG. 4. If not specially mentioned, it is assumed that all operations of FIG. 6 are performed by the controller 220 of FIG. 4. For understanding of description, FIG. 4 is also referred to.

Referring to FIG. 6, when an ignition of a vehicle is turned on, the sensor receiver 200 is supplied with the ignition power, and starts to operate, in operation S610.

Subsequently, in operation S612, during a period in which the sensor transmitter 100 maintains the wakeup mode, the sensor receiver 200 receives wireless communication data, including a tire pressure value, a tire inside temperature value, and a stop time value, from the sensor transmitter 100.

Subsequently, in operation S614, the controller 220 estimates an external temperature by using the time inside temperature value and the stop time value which are included in the wireless communication data.

Subsequently, the controller 220 calculates an actual tire pressure by using the estimated external temperature in operation S616, and based on the calculated tire pressure, the controller 220 sets a condition for notifying or releasing a low pressure warning of a tire, in operation S618.

According to the present invention, the sensor receiver receives information about a vehicle stop time from the sensor transmitter through wireless communication, and estimates an external temperature of a vehicle by using the received information, thereby setting an external temperature based on the estimated external temperature even when the sensor receiver does not receive the external temperature from another sensor or various electronic control units of the vehicle through vehicle network communication. Accordingly, a tire pressure change can be smoothly monitored.

Moreover, the sensor receiver receives the information about the stop time only when an ignition of the vehicle is turned on, thereby minimizing a dark current caused by power which is continuously supplied for operating the sensor receiver.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for estimating an external temperature for monitoring a tire pressure, the apparatus comprising:
   a sensor transmitter configured to compare a stop time of a vehicle with a reference time value, in response to determining that the vehicle is in a running state, and to transmit stop time information by using wireless communication, in response to a result of the comparison; and
   a sensor receiver configured to receive the stop time information through the wireless communication, and to measure an external temperature of a tire of the vehicle by using the received stop time information,
   wherein the stop time information is obtained by measuring the stop time of the vehicle at intervals, and
   wherein the reference time value is a length of time required for an internal temperature of the tire to reach an ambient temperature value when the vehicle maintains a stop state.

2. The apparatus of claim 1, wherein the sensor transmitter is further configured to be switched to a wakeup mode at intervals, and is further configured to measure the stop time while maintaining the wakeup mode.

3. The apparatus of claim 2, wherein the sensor transmitter is further configured to be switched from the wakeup mode to a sleep mode, in response to the running state of the vehicle being sensed in the wakeup mode.

4. The apparatus of claim 1, wherein the sensor transmitter is further configured to transmit the stop time information at a time when the running state of the vehicle is sensed.

5. The apparatus of claim 4, wherein the sensor transmitter is further configured to transmit the stop time information, in response to the stop time exceeding the reference time value.

6. The apparatus of claim 4, wherein the sensor transmitter is further configured to determine that the vehicle is in the running state, in response to determining that a measured speed of the vehicle exceeds a reference speed, and to determine that the vehicle is in the stop state, in response to determining that the measured speed of the vehicle is lower than the reference speed.

7. The apparatus of claim 1, wherein the sensor receiver is further configured to receive the stop time information, in response to an ignition of the vehicle being turned on.

8. The apparatus of claim 7, wherein the sensor receiver is further configured to be supplied with ignition power which is generated when the ignition of the vehicle is turned on, and to receive the stop time information.

9. The apparatus of claim 8, wherein the sensor receiver is further configured to operate entirely on the ignition power.

10. The apparatus of claim 1, wherein
the sensor receiver is further configured to receive, along with the stop time information, tire inside temperature information which is measured by the sensor transmitter, and
the sensor receiver is further configured to estimate the tire inside temperature as an external temperature at an initial running stage of the vehicle, in response to the stop time exceeding a time period.

11. The apparatus of claim 1, wherein the sensor transmitter is further configured to
periodically switch between a wakeup mode and a sleep mode, and
periodically sense the tire pressure, an internal temperature of the tire, the running state of the vehicle, and the stop time of the vehicle, while being in the wakeup mode.

12. The apparatus of claim 1, wherein the sensor transmitter is further configured to transmit the stop time information, in response to the stop time being greater than or equal to the reference time value, and to clear the stop time value and switch from a wakeup mode to a sleep mode, in response to the stop time value being less than the reference time value.

13. An apparatus for estimating an external temperature for monitoring a tire pressure, the apparatus comprising:
a sensor transmitter configured to transmit stop time information which is obtained by measuring a stop time of a vehicle at intervals, by using wireless communication; and
a sensor receiver configured to receive the stop time information through the wireless communication, and to measure an external temperature of a tire of the vehicle by using the received stop time information,
wherein the sensor transmitter is further configured to
determine that the vehicle is in a running state, in response to determining that a measured speed of the vehicle exceeds a reference speed,
transmit the stop time information at a time when the running state of the vehicle is sensed,
determine that the vehicle is in a stop state, in response to determining that the measured speed of the vehicle is lower than the reference speed, and
compare the stop time with a reference time value, in response to the determining that the vehicle is in the running state, and
wherein the reference time value is a length of time required for an internal temperature of the tire to reach an ambient temperature value when the vehicle maintains the stop state.

* * * * *